United States Patent [19]

Webb

[11] Patent Number: 5,277,384
[45] Date of Patent: Jan. 11, 1994

[54] TRANSPARENCY QUICK SEAL SYSTEM

[75] Inventor: Roger M. Webb, Grand Prairie, Tex.

[73] Assignee: Texstar, Inc., Grand Prairie, Tex.

[21] Appl. No.: 958,484

[22] Filed: Oct. 8, 1992

Related U.S. Application Data

[63] Continuation of Ser. No. 787,580, Nov. 4, 1991, abandoned.

[51] Int. Cl.$^5$ .............................................. B64C 1/14
[52] U.S. Cl. ........................... 244/129.3; 244/121; 244/129.4; 49/490.1; 277/226
[58] Field of Search .................. 244/129.3, 131, 132, 244/121, 129.4; 49/488, 490, 498; 277/226, 183, 184; 296/201; 264/252

[56] References Cited

U.S. PATENT DOCUMENTS

| | | | |
|---|---|---|---|
| 3,907,310 | 9/1975 | Dufour | 277/226 X |
| 4,143,497 | 3/1979 | Offenbacher | 49/490 X |
| 4,348,443 | 9/1982 | Hein | 49/490 X |
| 4,411,941 | 10/1983 | Azzola | 49/490 X |
| 4,491,330 | 1/1985 | Weihsmann | 277/183 |
| 4,668,556 | 5/1987 | Hermann et al. | 49/490 X |
| 4,823,229 | 4/1989 | Waterland, III | 244/129.3 X |
| 4,877,658 | 10/1989 | Calhoon | 244/129.3 |
| 4,964,594 | 10/1990 | Webb | 244/131 |

FOREIGN PATENT DOCUMENTS 0968826 6/1975 Canada .............................. 277/226

*Primary Examiner*—Margaret A. Focarino
*Assistant Examiner*—Christopher P. Ellis
*Attorney, Agent, or Firm*—Timmons & Kelly

[57] ABSTRACT

A quick seal system is used to seal between an aircraft frame and a transparency, such as a canopy, a windshield, or a window. The system includes a fairing seal and a pressure seal. The fairing seal seals between the outer surface of the canopy and the fairing, while the pressure seal seals between the inner surface of the canopy and the aircraft frame. The pressure seal is an elongated strip of material, having an area of increased thickness to provide an increase sealing pressure. The fairing seal is also an elongated strip of material. The fairing seal is generally triangular, having a top surface, an inner surface, and an outer surface. The inner surface abuts the outer surface of the canopy. A pair of extensions form a longitudinal slot on the outer surface of the fairing seal. The upper edge of the fairing is secured in the slot with an adhesive. If desired, the fairing seal and the adhesive may be electrically conductive.

9 Claims, 2 Drawing Sheets

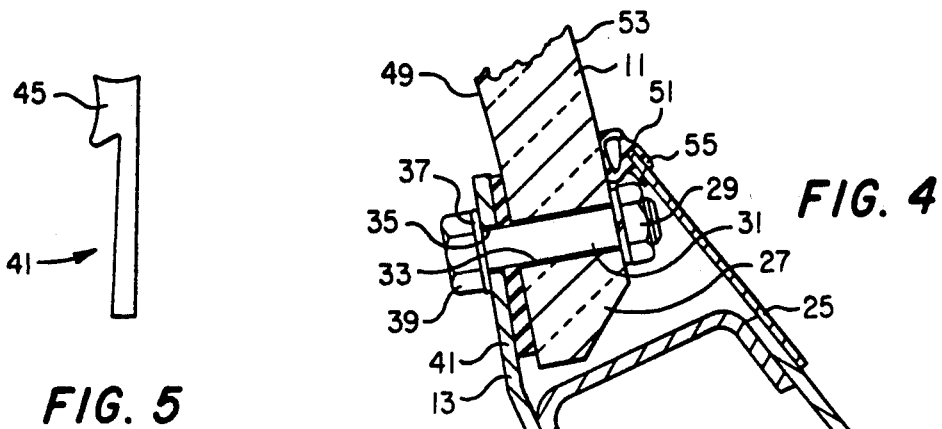
FIG. 5
FIG. 4
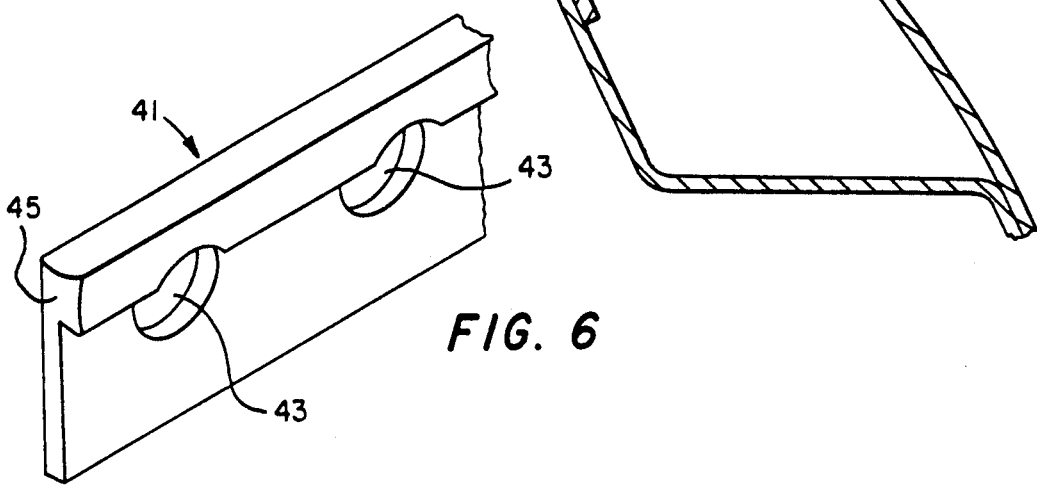
FIG. 6
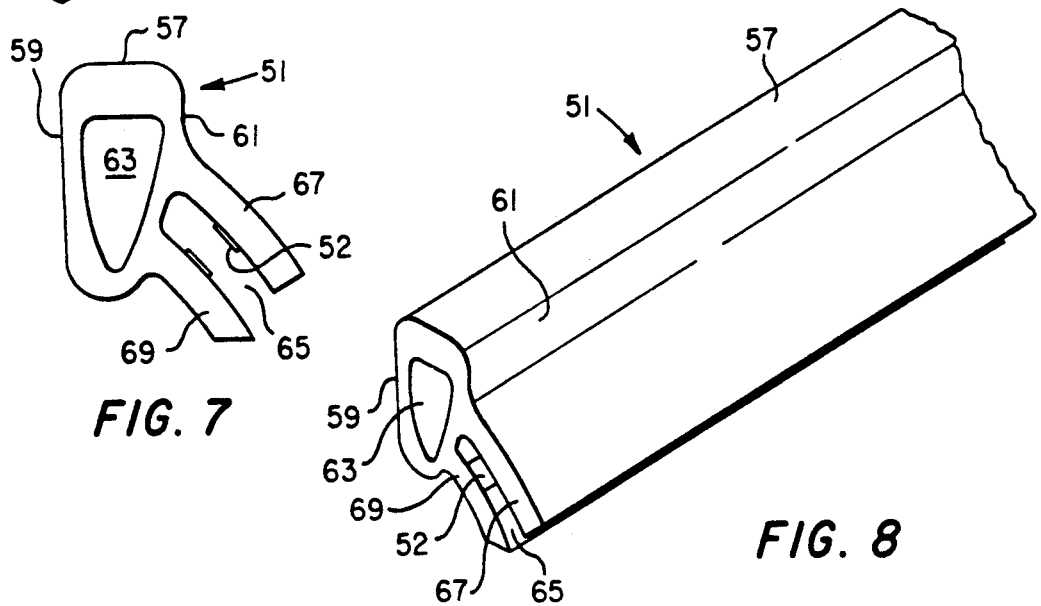
FIG. 7
FIG. 8

TRANSPARENCY QUICK SEAL SYSTEM

This application is a continuation of application Ser. No. 07/787,580 filed Nov. 4, 1991 now abandoned.

BACKGROUND OF THE INVENTION

1. Field of the Invention

This invention relates in general to sealing systems. In particular, the invention relates to sealing systems for sealing between a transparency, such as an aircraft canopy, and a vehicle frame.

2. Description of the Prior Art

The prior art is well described and shown in U.S. Pat. No. 4,964,594, issued on Oct. 23, 1990, to Webb. FIG. 1 of that patent illustrate transparency, such as a canopy, windshield, or window, is connected to an aircraft frame. After the transparency has been connected to the frame, a liquid sealant is applied near the edge of the transparency to help prevent liquids from passing between the fairing and the transparency.

The installation of a canopy may require as much as thirty-two man-hours using a wet type sealant. Also, when a wet type sealant has been applied, the sealant must be cured for a period of three days, before the aircraft may be available for flight.

When a transparency is to be removed, the wet sealant must be cut away with a razor knife. Excessive force may be required to free the transparency from the frame. Many otherwise reusable transparencies are damaged beyond repair because of damage received during removal. Also, when the wet sealant is scraped from the frame, protective coatings may also be removed.

Wet sealants are often toxic and emit harmful vapors. Such sealants also have a tendency to crack, allowing moisture to leak between the transparency and the frame.

SUMMARY OF THE INVENTION

The quick seal system of the invention seals between a transparency, such as a canopy, windshield, or window, and a vehicle frame. The system includes a canopy pressure seal located between the vehicle frame and the inner surface of the transparency. The pressure seal has an area of increased thickness near the upper edge of the pressure seal.

The system also includes a dry silicone fairing seal. The fairing seal is an elongated strip of material, attached to the edge of the fairing and abutting the outer surface of the transparency. The fairing seal has a longitudinal slot into which the edge of the fairing is placed to attach the fairing seal to the fairing. The longitudinal slot is formed by two extensions extending from a surface of the fairing seal.

BRIEF DESCRIPTION OF THE DRAWINGS

FIG. 4 is a sectional view of the transparency quick seal system of the invention, as seen along lines 4—4 in FIG. 3.

FIG. 5 is an end elevation of the transparency pressure seal of the invention.

FIG. 6 is a perspective view of the transparency pressure seal of the invention.

FIG. 7 is a sectional view of the transparency fairing seal of the invention, as seen along lines 7—7 in FIG. 8.

FIG. 8 is a perspective view of the transparency fairing seal of the invention.

DESCRIPTION OF THE PREFERRED EMBODIMENT

Figure 1:
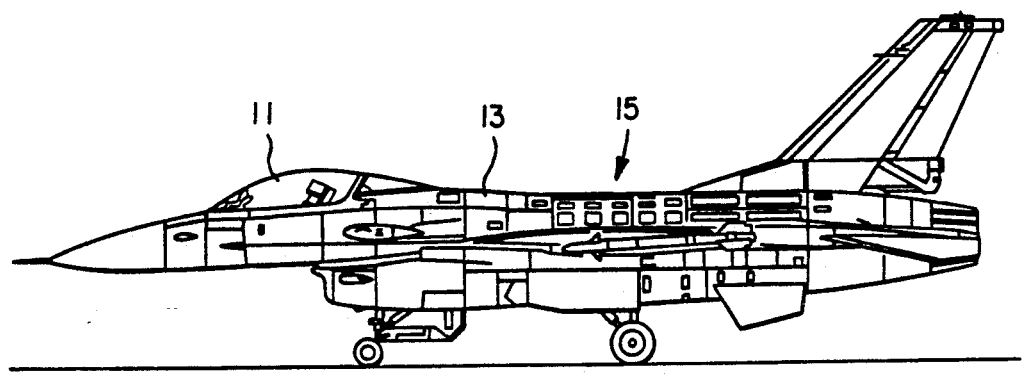
FIG. 1 is a side elevation of an aircraft incorporating a transparency quick seal system according to the invention.

The transparency quick seal system of the invention is useful in sealing a transparency, such as a canopy, a windshield, or a window, to a vehicle frame. One example of a use for this system is the sealing of a canopy 11 on the frame 13 of an aircraft 15, as shown in FIG. 1. The aircraft 15 shown in FIG. 1 is an F-16A Fighting Falcon.

Figure 2:
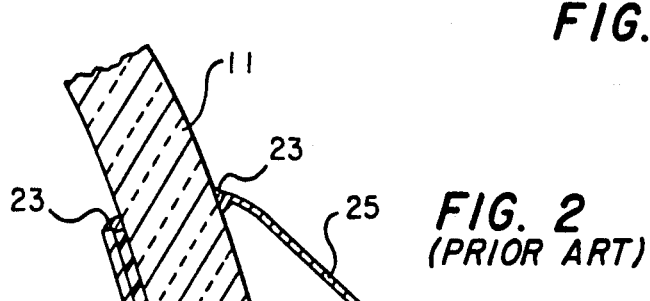
FIG. 2 is a sectional view of a prior art transparency seal system.

FIG. 2 illustrates the prior art method of sealing around the canopy 11 of an aircraft. The canopy 11 is first attached to the aircraft frame 13. A fairing 25 is then installed to reduce wind resistance. A liquid sealant 23 is then placed on the edge of the canopy 11 to help prevent any liquid from passing between the fairing 25 and the canopy 11 or under the canopy 11. The sealant 23 is also placed on the inner surface of the canopy 11 to prevent liquid from passing between the canopy 11 and the aircraft frame 13.

Figure 3:
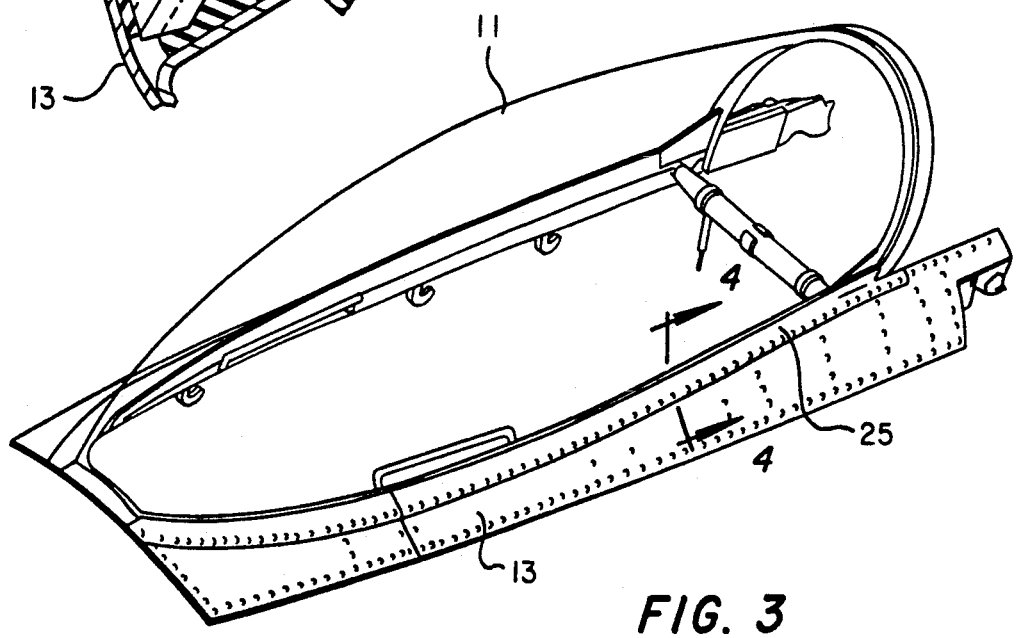
FIG. 3 is a perspective view of an aircraft canopy installed using the transparency quick seal system of the invention.

FIGS. 3 and 4 show close up views of the canopy 11 installed on the aircraft frame 13. A fairing 25 is attached to the aircraft frame 13 and extends upward toward the canopy 11. The bottom edge 27 of the canopy 11 is housed between the frame 13 and the fairing 25.

As shown in FIG. 4, the canopy 11 is attached to the aircraft frame 13 with a plurality of nuts 29 and bolts 31 passing through holes 33 in the canopy 11 aligned with holes 35 in the frame 13. An O-ring 37 seals between the frame 13 and the bolt head 39.

A transparency pressure seal 41 is sandwiched between the canopy 11 and the aircraft frame 13. The pressure seal 41 is shown in more detail in FIGS. 5 and 6. The pressure seal 41 is a strip of sealing material having a plurality of holes 43 to be aligned with the holes 33 in the canopy 11 and the holes 35 in the frame 13. The pressure seal 41 is preferably made of silicone with a fluorosilicone protective coating. The protective coating protects the seal 41 from hydrocarbons, such as deicing fluid and jet fuel, and other corrosive elements.

The pressure seal 41 has an area 45 of increased thickness adjacent the upper edge 47 of the pressure seal 41. This thickened area 45 provides an increased sealing, effect between inner surface 49 of the canopy 11 and the aircraft frame 13.

A dry fairing seal 51 seals between the outer surface 53 of the canopy 11 and the upper edge 55 of the fairing 25. The fairing seal 51 is shown in detail in FIGS. 7 and 8. Like the pressure seal 41, the fairing seal 51 is an elongated strip of material. The fairing seal 51 has a generally triangular shape, with a top surface 57, an inner surface 59, and an outer surface 61. The inner surface 59 of the fairing seal 51 abuts the outer surface 53 of the canopy 11, as seen in FIG. 4.

The top surface 57, inner surface 59, and outer surface 61 of the fairing seal 51 surround a triangular bore 63 extending the length of the fairing seal 51. The bore 63 gives the fairing seal 51 its flexibility and reduces the weight of the fairing seal 51.

A longitudinal slot 65 extends along the length of the fairing seal 51. The slot 65 is formed by a pair of extensions 67 and 69 extending outward and downward from the outer surface 61 of the fairing seal 51. The fairing seal 51 is secured to the fairing 25 with an adhesive 52, with the upper edge 55 of the fairing 25 in the slot 65 of the fairing seal 51, as shown in FIG. 4.

The preferred material for the fairing seal 51 is fluorosilicone rubber. If desired, the fairing seal 51 may include carbon or metallic filler material, rendering the seal 51 electrically conductive. An electrically conductive fairing seal 51, attached with an electrically conductive adhesive 52, allows the seal 51 to conduct electricity from the canopy 11 to the aircraft frame 13.

The transparency quick seal system of the invention has several advantages over the prior art. The system can be installed in less time than the prior art wet sealant. Also, the aircraft 15 can be pressure checked and flown immediately after installation, rather than having to wait for a sealant curing period.

The prior art requires that the bolts be retorqued one hour after the wet sealant has been applied, because the wet sealant causes a gelatinized effect on the original torque readings. The system of the invention does not require such a retorquing.

Unlike the wet sealant, the pressure seal 41 of the invention can be used more than once. Also, the canopy 11 is less likely to be damaged when being removed, if the system of the invention is used. The prior art wet sealant has to be cut with a razor knife, and excessive force may be required to remove the canopy 11.

Another advantage of the invention is that the seals of the invention do not emit harmful vapors. The wet sealant of the prior art is toxic and emits harmful vapors.

The fairing seal 51 of the invention also presents several additional advantages. The fairing seal 51 can be installed continuously from the aft side fairing to the front of the forward side fairing. No splice is required at the joint.

Since the fairing seal 51 is made of silicone, the fairing seal 51 will not crack. The prior art wet sealant sometimes cracks, and allows moisture to be trapped against the aircraft frame 13.

The invention has been shown in only one embodiment. It should be apparent to those skilled in the art that the invention is not so limited, but is susceptible to various changes and modifications without departing from the spirit of the invention.

I claim:

1. A transparency quick seal system for sealing between a substantially rigid transparency having an outer surface and an inner surface and an aircraft frame including a fairing extending between the aircraft frame and the outer surface of the transparency to receive the edge of the transparency in a well defined therebetween, the combination comprising:
    fastener means extending through said transparency and said frame for securing said transparency to said frame;
    a first pressure seal secured by said fastener means sandwiched between the aircraft frame and the inner surface of the transparency;
    said first pressure seal having a substantially L-shaped cross-section including a relatively thin first portion and a contiguously located relatively thicker second portion to increase the seal effect between the inner surface of the transparency and said aircraft frame and including a plurality of apertures at said contiguous location extending partially through each of said first and second portions and through which to receive said fastener means;
    a second pressure seal separate and independent of said first pressure seal and comprising an elongated strip of dry silicone elastomeric material attached to a distal edge of the fairing and abutting against the outer surface of the transparency for sealing between the transparency and the fairing;
    said second pressure seal being of an integral composition having an inner surface abutting the outer surface of the transparency and an outer surface having a bifurcated extension extending in a substantially lateral relation from said outer surface so as to define a pair of flexible extensions with an intervening longitudinal slot opening into which the distal edge portion of the fairing is received, the longitudinal slot being formed with internal surface contours substantially conforming with the opposite surface contours of the received distal edge portion of the received fairing for oppositely engaging the surfaces of the received fairing to effect a form fit continuous seal therebetween; and
    a quantity of adhesive disposed on said internal surface contours for attaching said second seal to the received distal edge portion of the fairing.

2. A transparency quick seal system as recited in claim 1, further comprising an electrically conductive adhesive for securing the second seal to the fairing.

3. A transparency quick seal system as recited in claim 1, further comprising filler material within the second seal, rendering the second seal electrically conductive.

4. A transparency quick seal system as recited in claim 1, wherein the second seal has a triangular bore extending the length of the second seal.

5. In an aircraft vehicle having a frame extending about a crew station opening in the vehicle, a fairing spaced from said frame so as to define an intervening gap therebetween and extending to a distal edge, a transparent canopy received in said gap to overly and enclose said crew station and seal means in said gap to seal the interior surface of said canopy to said frame and to seal the exterior surface of said canopy to said fairing, improved seal means comprising in combination:
    fastener means extending through said transparency and said frame for securing said transparency to said frame;
    a first pressure seal secured by said fastener means sandwiched between said frame and the inner surface of said canopy;
    said first pressure seal having a substantially L-shaped cross-section including a relatively thin first portion and a contiguously located relatively thicker second portion to increase the seal effect between the inner surface of the transparency and said aircraft frame and including a plurality of apertures at said contiguous location extending partially through each of said first and second portions and through which to receive said fastener means;
    a second pressure seal separate and independent of said first pressure seal and secured between the outer surface of said canopy and said fairing;
    said second pressure seal comprising an elongated strip of dry silicone elastomeric material attached to the distal edge of the fairing and abutting against the outer surface of the canopy for sealing between the canopy and the fairing and being of an integral composition having an inner surface abutting the outer surface of the canopy and an outer surface having a bifurcated extension extending in a substantially lateral relation from said outer surface so as to define a pair of flexible extensions with an intervening longitudinal slot opening into which the distal edge portion of the fairing is received, the longitudinal slot being formed with internal surface contours substantially conforming with the opposite surface contours of the received distal edge portion of the received fairing for oppositely engaging the surfaces of the received fairing to effect a form fit continuous seal therebetween; and a quantity of adhesive disposed on said internal surface contours for attaching said second seal to the received distal edge portion of the fairing.

6. Improved seal means as recited in claim 5, in which said adhesive is electrically conductive.

7. Improved seal means as recited in claim 5, further comprising filler material within said second seal rendering said second seal electrically conductive.

8. Improved seal means as recited in claim 5, wherein said second seal has a triangular bore extending the length of the seal.

9. Improved seal means as recited in claim 5 in which said frame and said canopy each have a plurality of longitudinally co-spaced apertures positioned substantially coaxially aligned with each other and the plurality of apertures of said first pressure seal are commonly co-spaced with the apertures of said frame and said canopy for coaxial positioning therebetween and said fastener means extend through the coaxial of said apertures for effecting said sandwiched relation.

* * * * *